US012580098B1

(12) United States Patent
McNutt

(10) Patent No.: US 12,580,098 B1
(45) Date of Patent: Mar. 17, 2026

(54) HYBRID CABLE WITH COAXIAL CONDUCTORS FORMED AROUND A BUFFER LAYER

(71) Applicant: Superior Essex International Inc., Atlanta, GA (US)

(72) Inventor: Christopher W. McNutt, Woodstock, GA (US)

(73) Assignee: Superior Essex International Inc., Atlanta, GA (US)

( * ) Notice: Subject to any disclaimer, the term of this patent is extended or adjusted under 35 U.S.C. 154(b) by 294 days.

(21) Appl. No.: 18/124,324

(22) Filed: Mar. 21, 2023

(51) Int. Cl.
*H01B 9/00* (2006.01)
*H01B 7/18* (2006.01)

(52) U.S. Cl.
CPC ........... *H01B 9/005* (2013.01); *H01B 7/1865* (2013.01)

(58) Field of Classification Search
CPC ................................ H01B 9/005; H01B 11/22
See application file for complete search history.

(56) References Cited

U.S. PATENT DOCUMENTS 5,493,626 A * 2/1996 Schultz ................. E21B 47/002 385/12
2020/0081209 A1* 3/2020 Martin Regalado ..... H01B 9/02

FOREIGN PATENT DOCUMENTS

CH 701871 A1 * 3/2011 ........... G02B 6/4416
WO WO-2011035450 A2 * 3/2011 ........... G02B 6/4416

OTHER PUBLICATIONS

Translation of CH701871A1 (Year: 2009).*
Translation of WO_2011035450_A2 (Year: 2011).*

* cited by examiner

*Primary Examiner* — Chad H Smith
(74) *Attorney, Agent, or Firm* — Rhett White

(57) ABSTRACT

A hybrid cable may include at least one optical fiber disposed within a buffer layer, and two conductors concentrically formed around the buffer layer. An inner conductor having a first direct current resistance may be formed around the buffer layer. An outer conductor may then be coaxially arranged around the inner conductor, and the outer conductor may have a second direct current resistance equal to or less than the first direct current resistance. A dielectric layer may be posited between the inner and outer conductors, and a jacket may be formed around the outer conductor.

8 Claims, 3 Drawing Sheets

HYBRID CABLE WITH COAXIAL CONDUCTORS FORMED AROUND A BUFFER LAYER

TECHNICAL FIELD

Embodiments of the disclosure relate generally to hybrid cables and, more particularly, to hybrid cables that include coaxial conductors formed around an optical fiber buffer layer.

BACKGROUND

Hybrid cables are utilized in a wide variety of applications that require the transmission of both power and communication signals. Conventional hybrid cables often include separate power conductors configured to transmit power and optical fiber units configured to transmit communication signals. As a result of including separate components, the weight and size (e.g., diameter, cross-sectional area, etc.) of a conventional hybrid cable is increased. Additionally, the separate components increase the space required for connectorizing or terminating the cable. Accordingly, there is an opportunity for improved hybrid cables that include coaxial conductors formed around an optical fiber buffer layer. There is also an opportunity for improved hybrid cables having reduced weight and/or smaller sizes relative to conventional hybrid cables. Further, there is an opportunity for improved hybrid cables that promote improved installation practices and/or that increase reliability of cable connections. There is also an opportunity for improved hybrid cables and conductors that can be optimized for low inductance and capacitance.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
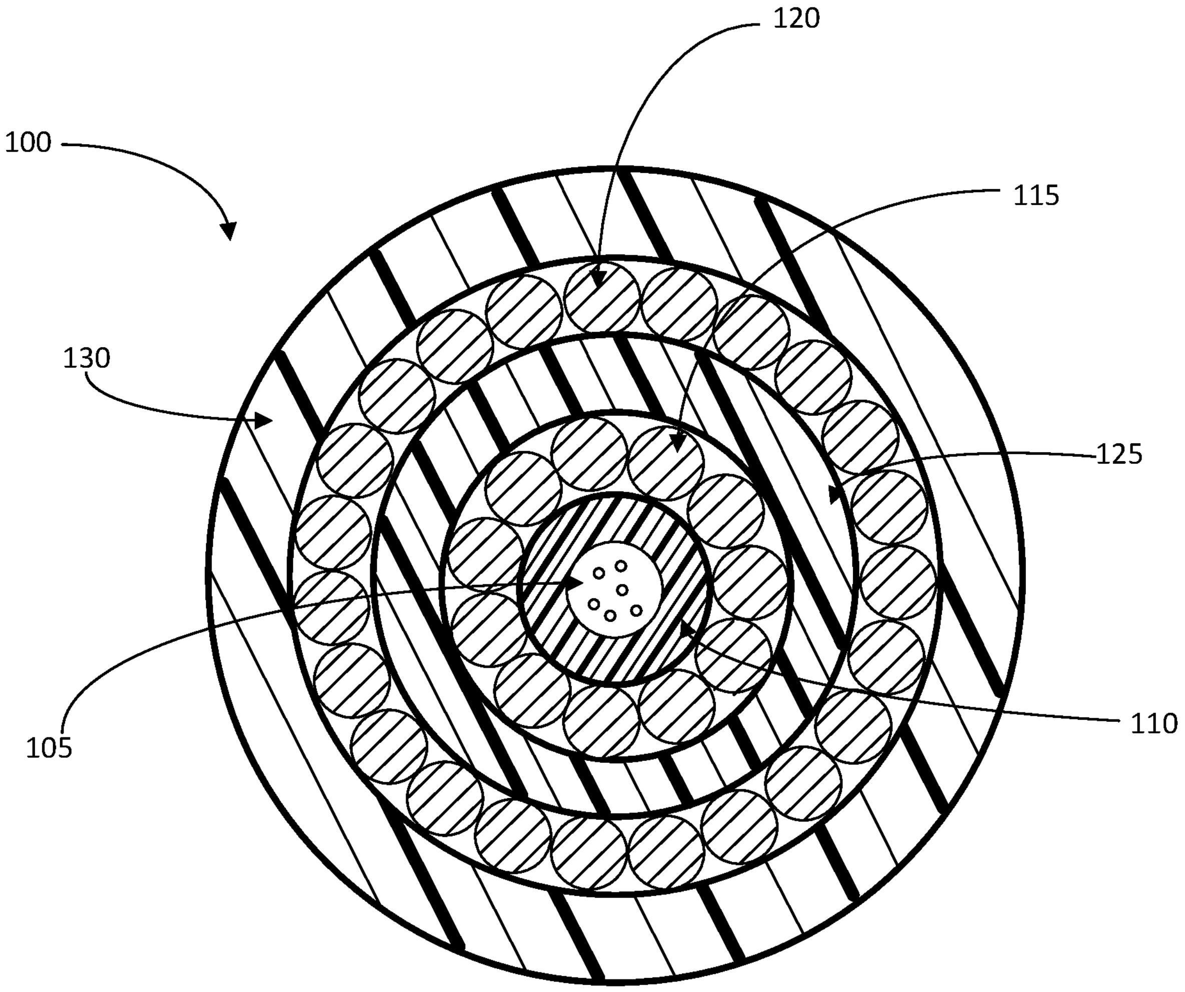
FIGS. 1-3 depict cross-sectional views of example hybrid cables that include coaxial conductors formed around an optical fiber buffer layer, according to illustrative embodiments of the disclosure.

Various embodiments of the present disclosure are directed to hybrid cables that include coaxial conductors formed around an optical fiber buffer layer. In certain embodiments, a cable may include a buffer layer, such as a tight buffer layer or a buffer tube. At least one optical fiber may be disposed within the buffer layer. Additionally, an inner conductor may be formed around the buffer layer. An outer conductor may be coaxially arranged around the inner conductor, and a dielectric layer may be positioned between the inner and outer conductors. According to an aspect of the disclosure, the inner conductor may have a first direct current ("DC") resistance, and the outer conductor may have a second DC resistance that is equal to or less than the first DC resistance. In certain embodiments, the first DC resistance and the second DC resistance may be approximately equal. As desired, the inner conductor and the outer conductor may constitute a balanced pair of conductors. For example, a first conductor may be used as a downstream conductor while the second conductor may be used as a return conductor during the transmission of a power signal. In other embodiments, the outer conductor may be used as a ground conductor.

In certain embodiments, the inner conductor may surround, encircle, or completely entrap the buffer layer. Additionally, in certain embodiments, the inner conductor may be in direct contact with the buffer layer. For example, the inner conductor may be in direct contact with the outer surface or outer periphery of the buffer layer along a longitudinal length of the cable (other than at terminations). The inner conductor may be formed with a wide variety of suitable constructions as desired in various embodiments. In certain embodiments, the inner conductor may include a plurality of conductive elements that are helically stranded around the buffer layer. The conductive elements may be helically stranded in a single layer or in a plurality of layers. For example, a plurality of conductive elements may be stranded in a single direction (e.g., clockwise, counterclockwise) or in at least two directions (e.g., different layers stranded in clockwise and counterclockwise directions, etc.). In other embodiments, the inner conductor may include a plurality of braided conductive elements. In the event that a plurality of conductive elements are utilized to form the inner conductor, each of the conductive elements may be formed as either a solid conductor or as a stranded conductor. Further, the conductive elements may be formed from any suitable conductive material or combination of materials. Additionally, the conductive elements may be formed with any suitable gauge, cross-sectional area, and/or other dimensions. In other embodiments, the inner conductor may be formed as a tube of conductive material; however, forming the inner conductor as a tube may reduce the overall flexibility of the cable. In the event that the inner conductor is formed as a tube, the inner conductor may have any suitable dimensions, such as any suitable inner and outer diameters. Regardless of the construction utilized to form the inner conductor, in certain embodiments, the inner conductor may have a minimum cross-sectional area of at least 0.258 $mm^2$ or a cross-sectional area between approximately 0.258 $mm^2$ and approximately 33.4 $mm^2$.

The dielectric layer may be formed from any suitable material and/or combination of materials. In certain embodiments, the dielectric layer may be formed from or include a melt processable thermoplastic polymeric material. In certain embodiments, the material(s) utilized to form the dielectric layer may be selected in order to optimize the capacitance and/or inductance of the cable. As desired, the dielectric layer may be formed as a single layer or, alternatively, may include any suitable number of sublayers. Additionally, the dielectric layer (or any of its individual sublayers) may be formed with any suitable thickness.

In certain embodiments, the outer conductor may surround, encircle, or completely entrap the dielectric layer. Additionally, in certain embodiments, the outer conductor may be in direct contact with the dielectric layer. For example, the outer conductor may be in direct contact with the outer surface or outer periphery of the dielectric layer along a longitudinal length of the cable (other than at terminations). The outer conductor may also be formed with a wide variety of suitable constructions as desired in various embodiments. In certain embodiments, the outer conductor may include a plurality of conductive elements that are helically stranded around the dielectric layer. The conductive elements may be helically stranded in a single layer or in a plurality of layers. For example, a plurality of conductive elements may be stranded in a single direction (e.g., clockwise, counterclockwise) or in at least two directions (e.g., different layers stranded in clockwise and counterclockwise directions, etc.). In other embodiments, the outer conductor may include a plurality of braided conductive elements. In the event that a plurality of conductive elements are utilized to form the outer conductor, each of the conductive elements may be formed as either a solid conductor or as a stranded conductor. Further, the conductive elements may be formed from any suitable conductive material or combination of materials. Additionally, the conductive elements may be formed with any suitable gauge, cross-sectional area, and/or other dimensions. In other embodiments, the outer conductor may be formed as a tube of conductive material; however, forming the outer conductor as a tube may reduce the overall flexibility of the cable. In the event that the outer conductor is formed as a tube, the outer conductor may have any suitable dimensions, such as any suitable inner and outer diameters. Regardless of the construction utilized to form the outer conductor, in certain embodiments, the outer conductor may have a minimum cross-sectional area of at least 0.258 $mm^2$ or a cross-sectional area between approximately 0.258 $mm^2$ and approximately 33.4 $mm^2$.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 depicts a cross-sectional view of an example hybrid cable 100 that includes coaxial conductors formed around a buffer layer, according to an illustrative embodiment of the disclosure. The cable 100 may include one or more optical fibers 105 positioned within a buffer layer 110, an inner conductor 115, an outer conductor 120, and a dielectric layer 125 positioned between the inner and outer conductors 115, 120. The inner and outer conductors 115, 120 may be coaxially arranged around the buffer layer 110. More particularly, the inner conductor 115 may be formed or otherwise positioned around the buffer layer 110, and the outer conductor 120 may be formed or otherwise positioned around the dielectric layer 125 (and other underlying components). Additionally, a jacket 130 or insulation layer may be formed around the outer conductor 120. Each of the components of the hybrid cable 100 are described in greater detail below.

The hybrid cable 100 may be suitable for use in a wide variety of desired applications. For example, the cable 100 may be suitable for use in applications in which the cable 100 is required to support its own load or weight, such as suspended or aerial applications. Additionally, the coaxial cable 100 may be utilized to transmit a wide variety of suitable signals, such as power and/or communications signals. In certain embodiments, the coaxial cable 100 may be suitable for use as a subcomponent in other cables, such as hybrid cables that include a combination of different types of transmission media. As one example, the coaxial cable 100 or a plurality of coaxially cables may be incorporated into a hybrid cable that additionally includes one or more optical fibers. In addition to being suitable for transmitting power and/or communications signals, the coaxial cable(s) may provide structural and/or anti-buckling support for the hybrid cable. As a result, a hybrid cable may be suitable for use in applications in which the hybrid cable must support its own load, such as suspended or aerial applications.

Figure 2:
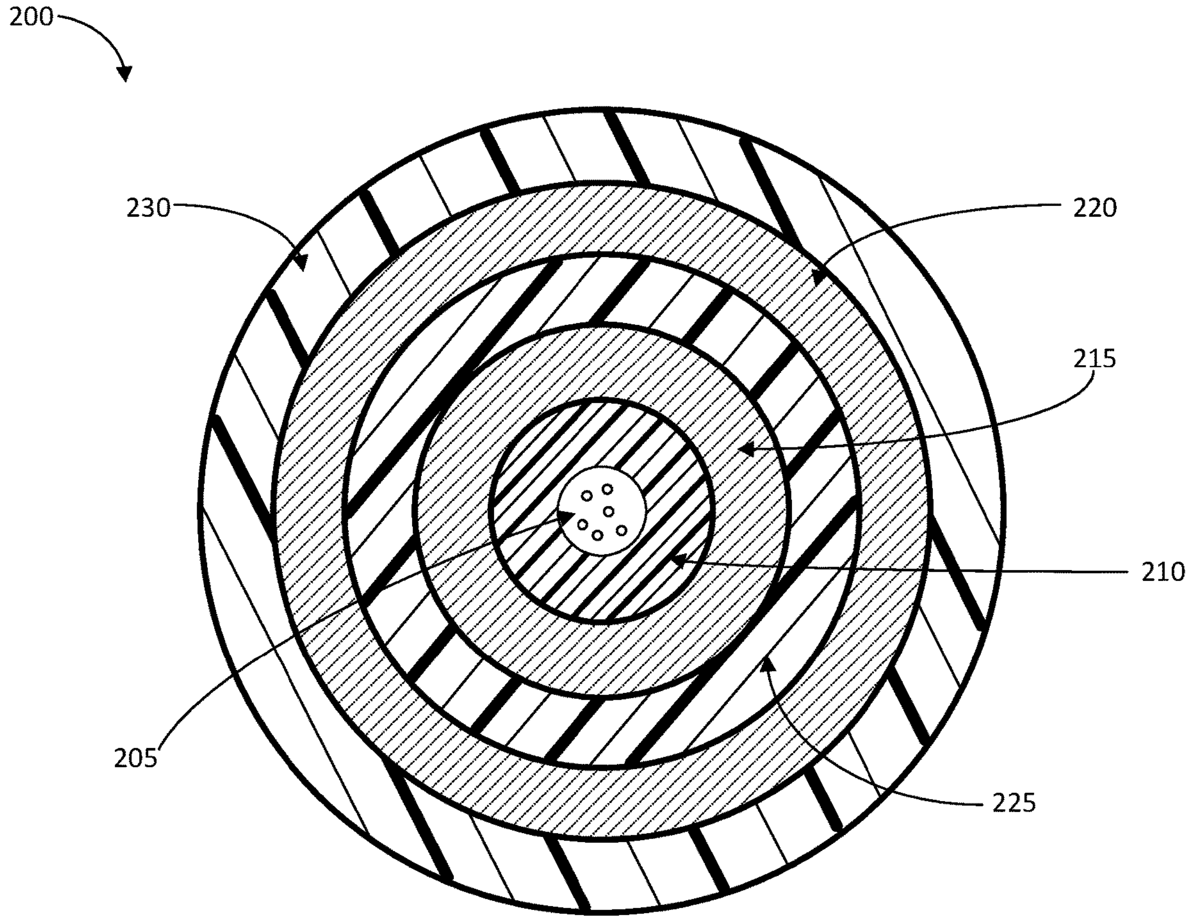
Figure 3:
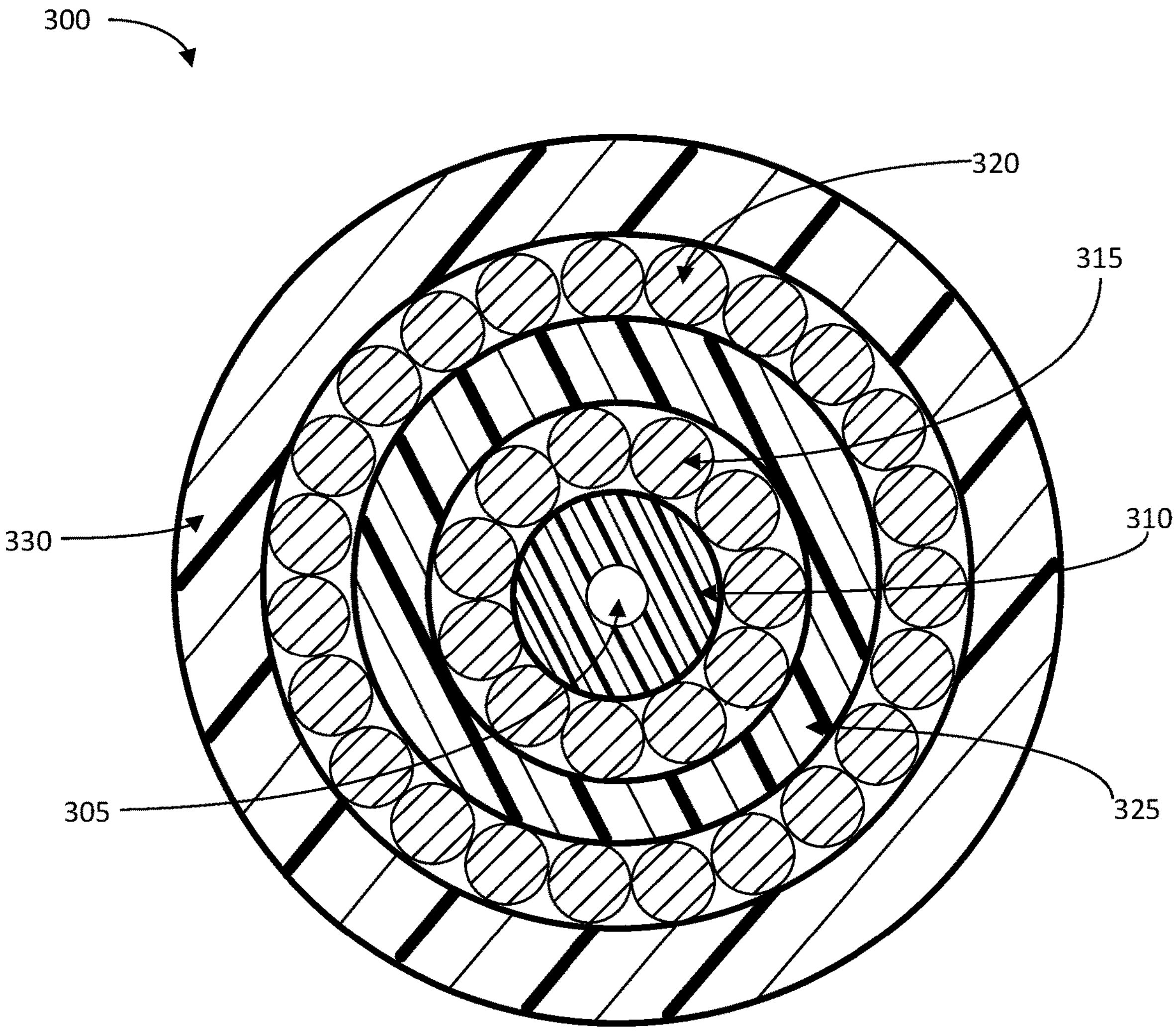

With reference to the cable 100 of FIG. 1, any suitable number of optical fibers 105 may be positioned within the buffer layer 110. For example, as shown in FIG. 3, a single optical fiber may be positioned within a tight buffer layer. As another example, as shown in FIGS. 1 and 2, a plurality of optical fibers 105 may be positioned within a loose buffer tube. For optical fibers 105 positioned within a loose buffer tube or other loose buffer layer, as desired in various embodiments, the optical fibers 105 may be loosely positioned within the buffer layer 110, wrapped or bundled together, or provided in one or more ribbons (e.g., ribbons formed with an acrylate coating, rollable ribbons, intermittently bonded or spiderweb-type bonded ribbons, etc.) and/or ribbon stacks.

Each optical fiber 105 utilized in the cable 100 may be a single mode fiber, multi-mode fiber, multi-core fiber, bend insensitive fiber, or some other optical waveguide that carries data optically. Additionally, each optical fiber 105 may be configured to carry data at any desired wavelength (e.g., 1310 nm, 1550 nm, etc.) and/or at any desired transmission rate or data rate. The optical fibers 105 may also include any suitable composition and/or may be formed from a wide variety of suitable materials capable of forming an optical transmission media, such as glass, a glassy substance, a silica material, a plastic material, or any other suitable material or combination of materials. Each optical fiber may also have any suitable cross-sectional diameter or thickness.

Each optical fiber 105 may have a wide variety of suitable constructions. In certain embodiments, an optical fiber 105 may include a core and a cladding. The cladding may have a lower index of refraction than that of the core, to facilitate propagation of one or more signals through the core. In certain embodiments, an optical fiber 105 may include a single core. In other embodiments, an optical fiber 105 may include multiple cores, and each core may be configured to propagate light at one or more desired wavelengths. An optical fiber 105 may also have any suitable cross-sectional diameter or thickness. For example, a single mode fiber may have a core diameter between approximately 8 micrometers and approximately 10.5 micrometers with a cladding diameter of approximately 125 micrometers. As another example, a multi-mode fiber may have a core diameter of approximately 50 micrometers or 62.5 micrometers with a cladding diameter of 125 micrometers. Other sizes of fibers may be utilized as desired.

In certain embodiments, one or more protective coatings may be formed on or around the cladding of an optical fiber 105. The protective coating(s) may protect the optical fiber 105 from physical, mechanical, and/or environmental damage. For example, the protective coating(s) may protect against mechanical stresses, scratches, and/or moisture damage. If multiple protective coatings are utilized, the coatings may be applied in concentric layers. In certain embodiments, a dual-layer protective coating approach may be utilized. An inner primary coating may be formed around the cladding, and an outer secondary coating may be formed around the inner coating. The outer secondary coating may be harder than the inner primary coating. In this regard, the inner primary coating may function as a shock absorber to minimize attenuation caused by microbending, and the outer secondary coating may protect against mechanical damage and act as a barrier to lateral forces. Other configurations of protective coating(s) may be utilized as desired in various embodiments. Additionally, the protective coating(s) may be formed from a wide variety of suitable materials and/or combinations of materials. A few example materials include, but are not limited to acrylates, acrylate resins, ultraviolet ("UV")-cured materials, urethane acrylate composite materials, etc.

The buffer layer 110 may house and protect the one or more optical fibers 105 positioned therein. Additionally, the buffer layer 110 may be formed with a wide variety of suitable constructions as desired in various embodiments. In certain embodiments, as illustrated in FIGS. 1 and 2, the buffer layer 110 may be formed as a loose tube or loose buffer layer. As set forth above, any suitable number of optical fibers may be positioned within a loose tube buffer layer 110. A loose buffer tube 110 may typically house between 6 and 244 optical fibers, although other suitable numbers of fibers may be utilized in other embodiments. In certain embodiments, a plurality of fibers 105 may be free to move or shift within a loose buffer tube 110. In other embodiments, a buffer tube 110 may be formed as a microtube in which movement of the optical fibers 105 is limited. For example, a microtube may have an inner diameter sized to prevent optical fibers 105 contained therein from crossing over one another or changing positioned relative to one another along a longitudinal length of the cable 100.

As desired, a wide variety of other components may be incorporated into a buffer tube 110, such as one or more strength yarns, other strength materials, water blocking tapes, water blocking yarns, elastomeric coupling components, powders, moisture absorbing materials, water-swellable materials, dry filling compounds, foam material, a filler matrix, etc. Additionally, in certain embodiments, a buffer tube 110 may be formed as a dry cable component that does not include any gels, greases, or other filling compounds. In other embodiments, a buffer tube 110 may be filled with a suitable filling compound that provides water blocking and/or other protection to the optical fibers 105.

In other embodiments, as illustrated in FIG. 3, the buffer layer 110 may be formed as a tight buffer layer. A tight buffer layer may be formed around an optical fiber and, if present, the protective coating(s) and/or any intermediate layers (e.g., release layers to facilitate easier stripping of the tight buffer, etc.). In certain embodiments, a tight buffer layer may be formed in intimate contact with an underlying layer along a longitudinal length of the optical fiber. In other words, the tight buffer layer may encapsulate the underlying optical fiber at any given cross-section of the optical fiber taken along a longitudinal direction.

In yet other embodiments, a plurality of tight buffer layers may be incorporated into the cable 100. For example, the inner conductor 115 may be formed around a plurality of tight buffered optical fibers. As desired, one or more suitable bindings or wraps may be formed around the plurality of tight buffered optical fibers to maintain their positions while the inner conductor 115 is formed. In other embodiments, a suitable inner jacket may be formed around the plurality of tight buffered optical fibers, and the inner conductor 115 may be formed around the inner jacket.

Regardless of the construction used for the buffer layer 110 (e.g., a buffer tube, a tight buffer, etc.), the buffer layer 110 may be formed from a wide variety of suitable materials and/or combinations of materials, such as various polymeric materials, nucleated polymeric materials, etc. Examples of suitable materials that may be utilized to form a buffer layer 110 include, but are not limited to polypropylene ("PP"), polyvinyl chloride ("PVC"), a low smoke zero halogen ("LSZH") material, polyethylene ("PE"), nylon, polybutylene terephthalate ("PBT"), polyvinylidene fluoride ("PVDF"), fluorinated ethylene propylene ("FEP"), etc. Additionally, in certain embodiments, the buffer layer 110 may be formed as a single layer. In other embodiments, the buffer layer 110 may include a plurality of layers, such as a plurality of co-extruded or successively extruded layers. In the event that a plurality of layers are utilized, in certain embodiments, each layer may be formed from the same or from similar materials. In other embodiments, at least two layers may be formed from different materials. Additionally, one or more additives or fillers may be combined, mixed, or blended with a base material (e.g., a base polymeric material) utilized to form a buffer layer 110. For example, one or more flame retardant materials, smoke suppressants, and/or other additives may be combined with a base polymeric material.

A wide variety of suitable methods and/or techniques may be utilized as desired to form a buffer layer 110. In certain embodiments, a buffer layer 110 may be extruded via one or more suitable extrusion devices, such as one or more suitable extrusion heads. In certain embodiments, a buffer layer 110 (e.g., a buffer tube, a tight buffer, etc.) may be extruded around one or more optical fibers 105. In other embodiments, a buffer layer 110 (e.g., a buffer tube) may be formed, and one or more optical fibers 105 may subsequently be air-blown or otherwise positioned within the buffer layer 110.

Further, a buffer layer 110 may have any suitable inner diameter, outer diameter, and/or thickness as desired in various applications. An example tight buffer layer may have an inner diameter that is approximately equal to an outer diameter of the optical fiber 105 and/or any intermediate layers. A tight buffer layer may also be formed with any suitable outer diameter, such as an outer diameter of approximately 900 microns. In other embodiments, a tight buffer layer may be formed to have an outer diameter of approximately 400, 500, 600, 700, 800, or 900 microns, an outer diameter included in a range between any two of the above values, or an outer diameter included in a range bounded on a maximum end by one of the above values. Other suitable outer diameters may be utilized as desired for a tight buffer layer. Further, a tight buffer layer may be formed with a wide variety of suitable thicknesses (i.e., a difference between an inner and outer diameter) as desired in various embodiments. In certain example embodiments, a tight buffer layer may have a thickness between approximately 50 microns and approximately 875 microns.

A buffer tube may also be formed with a wide variety of suitable dimensions, such as any suitable inner diameter, outer diameter, and/or thickness. In certain embodiments, an inner diameter of a buffer tube may be sized to facilitate housing of a desired number of optical fibers and other internal components. An outer diameter of a buffer tube may be sized to facilitate achievement of a desired overall cable size or cable diameter. In certain embodiments, a buffer tube may have an outer diameter of approximately 1.5 mm, 2.0 mm, 2.5 mm, 3.0 mm, 3.5 mm, 4.0 mm, 5.0 mm, 6.0 mm, an outer diameter included in a range between any two of the above values, or an outer diameter included in a range bounded on a maximum end by one of the above values.

With continued reference to FIG. 1, an inner conductor 115 and an outer conductor 120 may be coaxially or concentrically formed around the buffer layer 110. In certain embodiments, the inner and outer conductors 115, 120 may have a common central axis that extends along a longitudinal direction of the cable 100. The inner conductor 115 may be formed around the buffer layer 110. In certain embodiments, the inner conductor 115 may surround, encircle, or completely entrap the buffer layer 110. Additionally, in certain embodiments, the inner conductor 115 may be in direct contact with the buffer layer 110. For example, the inner conductor 115 may be in direct contact with the outer surface or outer periphery of the buffer layer 110 along a longitudinal length of the cable 100 (other than at terminations).

The inner conductor 115 may be formed with a wide variety of suitable constructions as desired in various embodiments. In certain embodiments, as shown in FIGS. 1 and 3, the inner conductor 115 may include a plurality of conductive elements that are helically stranded around the buffer layer 110. For example, a plurality of uninsulated conductive elements in electrical contact with one another such that they form a single overall inner conductive layer may be helically stranded around the buffer layer 110. Any desired number of conductive elements may be utilized. The conductive elements may be helically stranded in a single layer or in a plurality of layers (e.g., a plurality of concentric layers). For example, a plurality of conductive elements may be stranded in a single direction (e.g., clockwise, counter-clockwise) or in at least two directions (e.g., different layers stranded in clockwise and counterclockwise directions, etc.). In other embodiments, the inner conductor 115 may include a plurality of braided conductive elements. Any suitable number of conductive elements may be utilized to form a braid. In the event that a plurality of conductive elements are utilized to form the inner conductor 115, each of the conductive elements may be formed as either a solid conductor or as a stranded conductor (with any suitable number of strands). Additionally, each of the conductive elements may be formed with any suitable gauge, cross-sectional area, and/or other dimensions.

In other embodiments, as shown in FIG. 2, the inner conductor 115 may be formed as a tube or single continuous layer of conductive material. However, forming the inner conductor 115 as a tube may reduce the overall flexibility of the cable 100, and the reduction of flexibility may increase as the overall cable diameter and the inner conductor dimensions increase. In the event that the inner conductor 115 is formed as a tube, the inner conductor may have any suitable dimensions, such as any suitable inner diameter, outer diameter, cross-sectional area, and/or thickness. For example, the inner diameter may be approximately equal to the outer diameter of the buffer layer 110. The outer diameter and thickness may be selected in various embodiments to provide the inner conductor 115 with a desired power transmission capability, direct current resistance, and/or other suitable electrical properties.

The inner conductor 115 and/or any conductive elements incorporated into the inner conductor 115 may be formed from any suitable conductive material or combination of materials. For example, the inner conductor 115 (or any conductive elements) may be formed from any suitable electrically conductive material, such as copper, aluminum, silver, annealed copper, gold, a conductive alloy, conductive composite materials, carbon nanotubes, etc. Indeed, suitable electrically conductive materials may include any material having an electrical resistivity of less than approximately $1\times10^{-7}$ ohm meters at approximately 20° C., such as an electrical resistivity of less than approximately $3\times10^{-8}$ ohm meters at approximately 20° C.

Regardless of the construction utilized to form the inner conductor 115, the inner conductor 115 may be formed with a wide variety of suitable overall dimensions, such as any suitable inner diameter, outer diameter, cross-sectional area, and/or thickness. For example, the inner conductor 115 may have an inner diameter that is approximately equal to the outer diameter of the buffer layer 110. The outer diameter, cross-sectional area, and/or thickness may be selected in various embodiments to provide the inner conductor 115 with one or more desired electrical properties. For example, in certain embodiments, the inner conductor 115 may be sized in order to facilitate transmission of a desired power signal via the cable 100. In certain embodiments, the inner conductor 115 may be configured to carry a current of at least 2.0 amps at 60° C. For example, the inner conductor 115 may carry a current between approximately 2.0 and approximately 95 amps at 60° C. In various embodiments, the inner conductor 115 may carry a current of approximately 2, 5, 10, 15, 25, 30, 40, 50, 70, 85, or 95 amps at 60° C., a current included in a range bounded on the minimum end by one of the above values, or a current included in a range between any two of the above values. In certain embodiments, the inner conductor 115 may be configured to carry any suitable power signal, such as a power signal of at least 95 watts. In certain embodiments, the inner conductor 115 may have a cross-sectional area of at least 0.258 $mm^2$. In other embodiments, the inner conductor 115 may have a cross-sectional area between approximately 0.258 $mm^2$ and approximately 33.4 $mm^2$. For example, the inner conductor 115 may have a cross-sectional area of at least 0.258, 0.5, 1.0, 2.5, 5.0, 7.5, 10, 12.5, 15, 17.5, 20, 22.5, 25, 27.5, or 30 $mm^2$, a cross-sectional area included in a range between any two of the above values, or a cross-sectional area included in a range between any of the above values and 33.4 $mm^2$. Additionally, the inner conductor 115 may be formed to include any suitable direct current ("DC") resistance. For purposes of this disclosure, the inner conductor 115 may have a first DC resistance. In various example embodiments, the inner conductor 115 may have a DC resistance between 0.5127 and 66.79 mΩ/m at 20° C. For example, the inner conductor 115 may have a DC resistance of approximately 0.5127, 1.0, 2.5, 3.0, 5.0, 6.571, 10.0, 15.0, 25.0, 40.0, 50.0, or 66.79 mΩ/m at 20° C., a DC resistance included in a range bounded on either the minimum or maximum end by one of the above values, or a DC resistance included in a range between any two of the above values.

With continued reference to FIG. 1, the outer conductor 120 may be concentrically formed around the inner conductor 115, and the dielectric layer 125 may be positioned between the inner and outer conductors 120, 125. In certain embodiments, the outer conductor 120 may surround, encircle, or completely entrap the dielectric layer 125 and the inner conductor 115. Additionally, in certain embodiments, the outer conductor 120 may be in direct contact with the dielectric layer 125. For example, the outer conductor 120 may be in direct contact with the outer surface or outer periphery of the dielectric layer 125 along a longitudinal length of the cable 100 (other than at terminations).

The outer conductor 120 may be formed with a wide variety of suitable constructions as desired in various embodiments. In certain embodiments, as shown in FIGS. 1 and 3, the outer conductor 120 may include a plurality of conductive elements that are helically stranded around the dielectric layer 125. For example, a plurality of uninsulated conductive elements in electrical contact with one another such that they form a single overall outer conductive layer may be helically stranded around the dielectric layer 125.

Any desired number of conductive elements may be utilized. The conductive elements may be helically stranded in a single layer or in a plurality of layers (e.g., a plurality of concentric layers). For example, a plurality of conductive elements may be stranded in a single direction (e.g., clockwise, counterclockwise) or in at least two directions (e.g., different layers stranded in clockwise and counterclockwise directions, etc.). In other embodiments, the outer conductor 120 may include a plurality of braided conductive elements. Any suitable number of conductive elements may be utilized to form a braid. In the event that a plurality of conductive elements are utilized to form the outer conductor 120, each of the conductive elements may be formed as either a solid conductor or as a stranded conductor (with any suitable number of strands). Additionally, each of the conductive elements may be formed with any suitable gauge, cross-sectional area, and/or other dimensions. For ease of understanding, if both the inner and outer conductors 115, 120 include a plurality of conductive elements, the inner conductor 115 may include a first plurality of conductive elements while the outer conductor 120 includes a second plurality of conductive elements.

In other embodiments, as shown in FIG. 2, the outer conductor 120 may be formed as a tube or single continuous layer of conductive material. However, forming the outer conductor 120 as a tube may reduce the overall flexibility of the cable 100, and the reduction of flexibility may increase as the overall cable diameter and the outer conductor dimensions increase. In the event that the outer conductor 120 is formed as a tube, the outer conductor may have any suitable dimensions, such as any suitable inner diameter, outer diameter, cross-sectional area, and/or thickness. For example, the inner diameter may be approximately equal to the outer diameter of the dielectric layer 125. The outer diameter and thickness may be selected in various embodiments to provide the outer conductor 120 with a desired power transmission capability, direct current resistance, and/or other suitable electrical properties.

The outer conductor 120 and/or any conductive elements incorporated into the outer conductor 120 may be formed from any suitable conductive material or combination of materials. For example, the outer conductor 120 (or any conductive elements) may be formed from any suitable electrically conductive material, such as copper, aluminum, silver, annealed copper, gold, a conductive alloy, conductive composite materials, carbon nanotubes, etc. Indeed, suitable electrically conductive materials may include any material having an electrical resistivity of less than approximately $1\times10^{-7}$ ohm meters at approximately 20° C., such as an electrical resistivity of less than approximately $3\times10^{-8}$ ohm meters at approximately 20° C. In certain embodiments, the inner conductor 115 and the outer conductor 120 may be formed from the same conductive material, such as copper. In other embodiments, the inner conductor 115 and the outer conductor 120 may be formed from different conductive materials.

Regardless of the construction utilized to form the outer conductor 120, the outer conductor 120 may be formed with a wide variety of suitable overall dimensions, such as any suitable inner diameter, outer diameter, cross-sectional area, and/or thickness. For example, the outer conductor 120 may have an inner diameter that is approximately equal to the outer diameter of the dielectric layer 125. The outer diameter, cross-sectional area, and/or thickness may be selected in various embodiments to provide the outer conductor 120 with one or more desired electrical properties. For example, in certain embodiments, the outer conductor 120 may be sized in order to facilitate transmission of a desired power signal via the cable 100. In certain embodiments, the outer conductor 120 may be configured to carry a current of at least 2.0 amps at 60° C. For example, the outer conductor 120 may carry a current between approximately 2.0 and approximately 95 amps at 60° C. In various embodiments, the outer conductor 120 may carry a current of approximately 2, 5, 10, 15, 25, 30, 40, 50, 70, 85, or 95 amps at 60° C., a current included in a range bounded on the minimum end by one of the above values, or a current included in a range between any two of the above values. In certain embodiments, the outer conductor 120 may be configured to carry any suitable power signal, such as a power signal of at least 95 watts. In certain embodiments, the outer conductor 120 may have a cross-sectional area of at least 0.258 $mm^2$. In other embodiments, the outer conductor 120 may have a cross-sectional area between approximately 0.258 $mm^2$ and approximately 33.4 $mm^2$. For example, the outer conductor 120 may have a cross-sectional area of at least 0.258, 0.5, 1.0, 2.5, 5.0, 7.5, 10, 12.5, 15, 17.5, 20, 22.5, 25, 27.5, or 30 $mm^2$, a cross-sectional area included in a range between any two of the above values, or a cross-sectional area included in a range between any of the above values and 33.4 $mm^2$. Additionally, the outer conductor 120 may be formed to include any suitable direct current ("DC") resistance. For purposes of this disclosure, the outer conductor 120 may have a second DC resistance. In various example embodiments, the outer conductor 120 may have a DC resistance between 0.5127 and 66.79 mΩ/m at 20° C. For example, the outer conductor 120 may have a DC resistance of approximately 0.5127, 1.0, 2.5, 3.0, 5.0, 6.571, 10.0, 15.0, 25.0, 40.0, 50.0, or 66.79 mΩ/m at 20° C., a DC resistance included in a range bounded on either the minimum or maximum end by one of the above values, or a DC resistance included in a range between any two of the above values.

According to an aspect of the disclosure, the inner conductor 115 may have a first direct current ("DC") resistance, and the outer conductor 120 may have a second DC resistance that is equal to or less than the first DC resistance. In certain embodiments, the first DC resistance and the second DC resistance may be approximately equal. As desired, the inner conductor 115 and the outer conductor 120 may constitute a balanced pair of conductors. For example, a first conductor (e.g., one of the inner or outer conductors) may be used as a downstream conductor while the second conductor may be used as a return conductor during the transmission of a power signal. In other embodiments, the outer conductor 120 may be used as a ground conductor. When the outer conductor 120 is used as a ground, the second DC resistance may either be approximately equal to the first DC resistance or less than the first DC resistance. As desired in other embodiments, the inner and outer conductors 115, 120 of the cable 100 may be utilized to transmit communications signal as an alternative to or in addition to transmitting power signals.

With continued reference to the cable 100, the dielectric layer 125 may be positioned between the inner conductor 115 and the outer conductor 120. For example, the dielectric layer 125 may be formed around the inner conductor 105, and the outer conductor 110 may be formed around the dielectric layer 125. The dielectric layer 125 may function as insulation between the two conductors 105, 110. The dielectric layer 125 may be formed from any suitable material and/or combination of materials. In certain embodiments, the dielectric layer 125 may be formed from or include a melt processable thermoplastic polymeric material. Examples of suitable materials that may be utilized include, but are not limited to, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins, a low smoke zero halogen ("LSZH") material, etc.), nylon, polyurethane, neoprene, cholorosulphonated polyethylene, flame retardant PVC, low temperature oil resistant PVC, flame retardant polyurethane, flexible PVC, or a combination of any of the above materials.

In certain embodiments, the material(s) utilized to form the dielectric layer 125 and certain dimensions of the dielectric layer 125 may be selected in order to optimize the capacitance and/or inductance of the cable 100. For example, the dielectric layer 125 may be formed such that the cable 100 has an inductance of approximately 0.083 μH per foot or less. In various embodiments, the cable 100 may have an inductance of approximately 0.02, 0.025, 0.03, 0.04, 0.05, 0.06, 0.07, or 0.083 μH per foot, an inductance bounded on a maximum end by one of the above values, or an inductance included in a range between any two of the above values. As another example, the dielectric layer 125 may be formed such that the cable 100 has a capacitance of approximately 200 pF per foot or less. In various embodiments, the cable 100 may have a capacitance between approximately 10 and approximately 200 pF per foot. In yet other embodiments, the cable 100 may have a capacitance of approximately 25, 50, 75, 100, 125, 150, 175, or 200 pF per foot, a capacitance bounded on a maximum end by one of the above values, or a capacitance included in a range between any two of the above values.

As desired, the dielectric layer 125 may be formed as a single layer or, alternatively, may include any suitable number of sublayers. If a plurality of sublayers are used, in certain embodiments, each of the sublayers may be formed from the same material. In other embodiments, at least two sublayers may be formed from different materials. Further, a wide variety of suitable methods and/or techniques may be utilized to form the dielectric layer 125. In certain embodiments, a dielectric layer 125 may be extruded by one or more suitable extrusion crossheads or other extrusion assemblies. Additionally, the dielectric layer 125 may be formed as either solid insulation, foamed insulation, or with a combination of solid and foamed sublayers.

The dielectric layer 125 may also be formed with a wide variety of suitable dimensions, such as any suitable thickness and/or cross-sectional area. In certain embodiments, a thickness and/or other dimensions of the dielectric layer 125 may be based at least in part on the dimensions of the inner and/or outer conductors 110, 115 and/or a desired separation distance between the two conductors 110, 115. Additionally, in various embodiments, a thickness and/or other dimensions of the dielectric layer 125 may be based at least in part upon desired electrical properties for the cable 100, such as a desired inductance and/or capacitance. In certain embodiments, the dielectric layer 125 may have a thickness between approximately 0.38 mm and 20 mm. In various embodiments, the dielectric layer 125 may have a thickness of approximately 0.38, 0.9, 2.5, 5.0, 7.5, 10.0, 12.5, 15.0, 17.50, or 20 mm, a thickness included in a range between any two of the above values, or a thickness included in a range bounded on a maximum end by one of the above values. Additionally, the dielectric layer 125 may occupy any desired portion or percentage of the volume between the inner and outer conductors 115, 120. For example, in certain embodiments, the dielectric layer 125 may be formed as a solid component or as a solid layer between the inner conductor 115 and the outer conductor 125. In other embodiments, the dielectric layer 125 may be formed as a foamed layer or as a layer that includes spaces between a plurality of sections or components such that the dielectric material does not occupy the entire volume between the conductors 115, 120. For example, the dielectric layer 125 may be formed in a plurality of sections that are radially spaced around an outer circumference of the inner conductor 115.

With continued reference to the cable 100, a jacket 130 or suitable insulation may be formed around the outer conductor 120. The jacket 130 may provide protection for the internal components of the cable 100. The jacket 130 may include any suitable dielectric materials and/or combination of materials. Examples of suitable dielectric materials include, but are not limited to, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins, a low smoke zero halogen ("LSZH") material, etc.), nylon, polyurethane, neoprene, cholorosulphonated polyethylene, flame retardant PVC, low temperature oil resistant PVC, flame retardant polyurethane, flexible PVC, or a combination of any of the above materials.

In various embodiments, the jacket 130 may be formed from one or multiple layers of insulation material. A layer of insulation may be formed as solid insulation, unfoamed insulation, foamed insulation, or other suitable insulation. As desired, a combination of different types of insulation may be utilized. For example, a foamed insulation layer may be covered with a solid foam skin layer. Additionally, the jacket 130 may be formed with any suitable thickness, inner diameter, outer diameter, and/or other dimensions. As desired in various embodiments, jacket 130 may additionally include a wide variety of other materials (e.g., filler materials, materials compounded or mixed with a base insulation material, etc.), such as smoke suppressant materials, flame retardant materials, etc.

As desired, a wide variety of other components may be incorporated into the cable 100 in addition to those illustrated and described with respect to FIG. 1. For example, one or more ripcords may be incorporated into the cable jacket 130 or between the jacket 130 and the outer conductor 120. A ripcord may facilitate separating the jacket 130 from the internal components of the cable 100. As another example, one or more water blocking layers, moisture absorbing layers, strength members, and/or other desired components may be incorporated into the cable 100.

FIG. 2 depicts a cross-sectional view of another example hybrid cable 200 that includes coaxial conductors formed around a buffer layer, according to an illustrative embodiment of the disclosure. Much like the cable 100 of FIG. 1, the cable 200 may include one or more optical fibers 205 positioned within a buffer layer 210, an inner conductor 215, an outer conductor 220, and a dielectric layer 225 positioned between the inner and outer conductors 215, 220. The inner and outer conductors 215, 220 may be coaxially arranged around the buffer layer 210. Additionally, a jacket 230 or insulation layer may be formed around the outer conductor 220. Each of these components may be similar to those described above with reference to the cable 100 of FIG. 1.

However, in contrast to the cable 100 of FIG. 1, the cable 200 of FIG. 2 may include inner and outer conductors 215, 220 that are formed as tubes as opposed to being formed from respective pluralities of conductive elements. Although the cable 200 illustrates both the inner and outer conductors 215, 220 being formed as tubes, in other embodiments, the inner and outer conductors 215, 220 may have different constructions. For example, the inner conductor 215 may be formed as a tube while the outer conductor 220 is formed from a plurality of conductive elements (e.g., conductive elements helically stranded around the dielectric layer 225, etc.). As another example, the outer conductor 220 may be formed as a tube while the inner conductor 215 is formed from a plurality of conductive elements (e.g., conductive elements helically stranded around the buffer layer 210, etc.).

FIG. 3 depicts a cross-sectional view of another example hybrid cable 300 that includes coaxial conductors formed around a buffer layer, according to an illustrative embodiment of the disclosure. Much like the cable 100 of FIG. 1, the cable 300 may include one or more optical fibers 305 positioned within a buffer layer 310, an inner conductor 315, an outer conductor 320, and a dielectric layer 325 positioned between the inner and outer conductors 315, 320. The inner and outer conductors 315, 320 may be coaxially arranged around the buffer layer 310. Additionally, a jacket 330 or insulation layer may be formed around the outer conductor 320. Each of these components may be similar to those described above with reference to the cable 100 of FIG. 1.

However, in contrast to the cable 100 of FIG. 1, the cable 300 of FIG. 3 is illustrated as including a tight buffered optical fiber. In certain embodiments, a single optical fiber 305 may be disposed within a buffer layer 310 that is tightly formed around the fiber 305. The inner conductor 315 may then be formed around the tight buffer layer 310. As explained in greater detail above with reference to FIG. 1, in other embodiments, a plurality of tight buffered optical fibers may be incorporated into the cable 300.

The cables 100, 200, 300 illustrated in FIGS. 1-3 are provided by way of example only. Embodiments of the disclosure contemplate a wide variety of other cables and cable constructions. These other cables may include more or less components than the cables 100, 200, 300 illustrated in FIGS. 1-3. Additionally, certain components may have different dimensions and/or be formed from different materials than the components illustrated in FIGS. 1-3.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cable comprising:

a buffer layer;

at least one optical fiber disposed within the buffer layer;

an inner conductor formed around the buffer layer and having a first direct current resistance, the inner conductor comprising a first solid tube of conductive material having a cross-sectional area of at least 0.258 square millimeters;

an outer conductor coaxially arranged around the inner conductor, the outer conductor comprising a second solid tube of conductive material and having a second direct current resistance equal to or less than the first direct current resistance;

a dielectric layer positioned between the inner conductor and the outer conductor; and a jacket formed around the outer conductor.

2. The cable of claim 1, wherein the inner conductor and the outer conductor comprise a balanced pair of conductors.

3. The cable of claim 1, wherein the first direct current resistance and the second direct current resistance are approximately equal.

4. The cable of claim 1, wherein the buffer layer comprises one of (i) a buffer tube or (ii) a tight buffer layer.

5. The cable of claim 1, wherein the inner conductor has a cross-sectional area of at least 2.5 square millimeters.

6. The cable of claim 1, wherein the inner conductor has a cross-sectional area of at least 5.0 square millimeters.

7. The cable of claim 1, wherein the inner conductor has a cross-sectional area between 0.258 and 33.4 square millimeters.

8. The cable of claim 1, wherein the dielectric layer comprises a melt processable thermoplastic polymeric material.

* * * * *